United States Patent
Kumar et al.

(10) Patent No.: US 10,623,950 B2
(45) Date of Patent: Apr. 14, 2020

(54) SYSTEM FOR PROTECTING LOCATION INFORMATION

(71) Applicant: SIGNIFY HOLDING B.V., Eindhoven (NL)

(72) Inventors: Sandeep Shankaran Kumar, Waalre (NL); Ashish Vijay Pandharipande, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 88 days.

(21) Appl. No.: 15/739,803

(22) PCT Filed: Jun. 14, 2016

(86) PCT No.: PCT/EP2016/063554
§ 371 (c)(1),
(2) Date: Dec. 26, 2017

(87) PCT Pub. No.: WO2016/207018
PCT Pub. Date: Dec. 29, 2016

(65) Prior Publication Data
US 2018/0367988 A1    Dec. 20, 2018

(51) Int. Cl.
*H04W 12/02* (2009.01)
*H04L 29/06* (2006.01)
*H04W 4/029* (2018.01)

(52) U.S. Cl.
CPC ......... *H04W 12/02* (2013.01); *H04L 63/0428* (2013.01); *H04L 63/0471* (2013.01); *H04W 4/029* (2018.02)

(58) Field of Classification Search
CPC .. H04W 12/02; H04W 4/029; H04L 63/0428; H04L 63/0471
(Continued)

(56) References Cited

U.S. PATENT DOCUMENTS 7,852,205 B2 * 12/2010 Huseth ................. G08B 29/145
                                                          340/518
7,966,021 B2 *  6/2011 Dietrich ................ H04W 64/00
                                                          455/456.1
(Continued)

FOREIGN PATENT DOCUMENTS

WO    2015025235 A1   2/2015
WO    2015073822 A2   5/2015
WO    2016142225 A1   9/2016

OTHER PUBLICATIONS

Hui Liu, et al., "Survey of Wireless Indoor Positioning Techniques and Systems," IEEE Transactions on Systems, Man, and Cybernetics—Part C: Applications and Reviews, vol. 37, No. 6, Nov. 2007 (14 Pages).

(Continued)

*Primary Examiner* — Shahriar Zarrineh
(74) *Attorney, Agent, or Firm* — Stephen M. Kohen

(57) ABSTRACT

A system (200) for protecting location information has beacons (240), a provider server (220) for providing at least one location based service, a location server (230) and mobile devices (210). The mobile device has a location engine (211) for controlling the location information and a location based application (212) for using the location information. The provider server generates unique data and authorizes the location based application, and subsequently provides location based services in dependence on an encrypted location. The location server determines the location based on a property of the radiation and encrypts the location. The location engine obtains a verification of customer data of the location based application, which indicates that use rights allow transfer of the location information to the location based application, and upon obtaining the verification transfers the encrypted location to the location based application. The location based application is autho- (Continued)

rized by the provider server, processes the encrypted location and uses the location based service.

11 Claims, 7 Drawing Sheets

(58) Field of Classification Search
USPC .......................................................... 713/153
See application file for complete search history.

(56) References Cited

U.S. PATENT DOCUMENTS

| | | | | |
|---|---|---|---|---|
| 8,681,741 B1* | 3/2014 | Ngo | ...................... | H04W 4/023 370/331 |
| 8,781,502 B1* | 7/2014 | Middleton | ......... | G06Q 30/0261 455/456.3 |
| 9,332,385 B1* | 5/2016 | Abraham | .............. | H04W 48/04 |
| 9,794,755 B1* | 10/2017 | South | ...................... | H04W 4/04 |
| 2012/0202447 A1* | 8/2012 | Edge | ........................ | H04W 8/16 455/404.2 |
| 2013/0311764 A1* | 11/2013 | Alpert | ..................... | H04L 63/00 713/150 |
| 2014/0162693 A1* | 6/2014 | Wachter | .................. | H04W 4/04 455/456.3 |
| 2014/0274136 A1* | 9/2014 | Edge | ..................... | H04W 4/029 455/456.2 |
| 2014/0351886 A1* | 11/2014 | Edge | ........................ | G06F 21/60 726/3 |
| 2015/0005011 A1* | 1/2015 | Nehrenz | ................ | H04W 4/023 455/456.3 |
| 2015/0030157 A1* | 1/2015 | Segev | ................... | G01S 5/0027 380/270 |
| 2015/0058947 A1* | 2/2015 | John | ..................... | H04W 12/06 726/7 |
| 2016/0095047 A1* | 3/2016 | Lee | ......................... | H04W 4/80 370/328 |
| 2016/0165570 A1* | 6/2016 | Kim | ...................... | H04W 4/023 455/456.2 |
| 2017/0026345 A1* | 1/2017 | Salek | ................... | H04L 63/0428 |
| 2017/0171754 A1* | 6/2017 | South | ...................... | H04W 4/90 |
| 2017/0269186 A1* | 9/2017 | Sharma | ................... | G01S 1/70 |
| 2017/0270630 A1* | 9/2017 | Creusen | ................ | G06T 1/005 |

OTHER PUBLICATIONS

D. Hardt, Ed., "The OAUTH 2.0 Authorization Framework," Internet Engineering Task Force, ISSN: 2070-1721, Oct. 2012 (76 Pages).

* cited by examiner

SYSTEM FOR PROTECTING LOCATION INFORMATION

CROSS-REFERENCE TO PRIOR APPLICATIONS

This application is the U.S. National Phase application under 35 U.S.C. § 371 of International Application No. PCT/EP2016/063554, filed on Jun. 14, 2016, which claims the benefit of European Patent Application No. 15173336.7, filed on Jun. 23, 2015. These applications are hereby incorporated by reference herein.

FIELD OF THE INVENTION

The invention relates to a system for protecting location information comprising beacons, a provider server, a location server and at least one mobile device. The invention further relates to a provider server method, a location server method, a location engine method for use in a mobile device, and a location based application method for use in a mobile device, and computer program products for use in the system.

The present invention relates generally to the field of indoor location systems, and more in particular provides various systems and methods of providing conditional access to location information within such a location system as well as corresponding computer program products.

BACKGROUND OF THE INVENTION

Over the last two decades outdoor navigation devices have been embraced by the general public. Satellite navigation using the GPS and Glonass satellites became available to consumers initially in the form of dedicated navigation devices, but has really taken off following the introduction of such functionality in smartphones. Apart from providing directions, e.g. in car navigation, such devices are also increasingly being used for providing location aware services.

A similar need for directions and location aware services exists in indoor areas. For example in large indoor complexes, such as hospitals, universities, parking lots, shopping malls, and/or offices.

In an indoor setting satellite based navigation technology generally does not provide sufficient signal strength to be able to perform indoor location determination. For this reason alternative techniques have been developed for position/location determination in indoor settings. Some of these alternative techniques use Radio Frequency (RF) based location determination. Such systems typically make use of multiple radio frequency (RF) transmitters with known locations, also known as anchor nodes or beacons. Other alternative techniques may make use of Visible Light Communication (VLC) transmitters with known locations or beacons which may make use of the usually fairly dense lighting infrastructure.

Similar to an outdoor location system, an indoor location system provides a service to consumers hereafter end-users; a service that end-users will eventually rely on. It is therefore important that the indoor location service is reliable. One aspect of reliability for an end-user is the accuracy of the location that is being reported. Another aspect of reliability is the continuity of the location being reported. A further aspect of reliability is the availability.

Generally an indoor location system will be deployed by a customer that will order such an indoor location system from a supplier. The customer is typically the party that owns/deploys the indoor location system, notably this party may also be the party that offers services based on the indoor location system, but this need not be the case. Consider e.g. a scenario wherein an airport owner also owns and deploys an indoor location system. Airlines and shops that are not necessarily affiliated with the airport owner could offer services based on the indoor location system. Hereafter offering such location based services will be called providing services by a service provider.

The deployment of an indoor location system will generally incur cost on the customer; as a result the customer will want to make sure that he can recuperate this cost. The cost can be earned back through the services provided based on the location system functionality. In the above example the airport owner will need to recover his investment from the providers that offer services based on the location system. As a result a mechanism is needed that supports such a diverse and complex scenario as the above airport. For paying location based service providers it is important that there are no free-riders; the system therefore also needs to be tamper-resilient.

The document US2015/0030157, reference [1] describes techniques for trusted location application and location provider communications. The techniques convey location information between a location provider and a trusted location application within a mobile device through trusted communications to preclude its provision to an untrusted location application. A mobile apparatus includes a processor component and the location provider for execution by the processor component comprising a location baseband unit to determine a current location in a venue based on wireless signals received from a location network of the venue, a verification component to verify a trusted location application associated with the venue based at least on credentials received from the trusted location application, and an encryption component to encrypt location information indicating the current location and convey the location information to the trusted location application through a location manager interposed between the location provider and the trusted location application based on verification of the trusted location application.

SUMMARY OF THE INVENTION

In the known system of US2015/0030157 [1], the location provider is part of the mobile device. In practice, the location provider and/or the location manager may be tampered with and therefore cannot be fully trusted. If so, the location information may still become accessible to an untrusted location application.

It is an object of the invention to provide a system for protection of location information where, in the mobile device, a trusted location based application is enabled to use location based services without other elements present in the mobile device being able to access or control the location information.

For this purpose, a system, devices and methods are provided as defined in the appended claims.

The system for protecting location information comprises beacons. Each beacon has a radiation emitter, the radiation comprising a beacon identifier and at least one location identifier for identifying an area where the beacons are located. Further data may also be encoded or modulated in the radiation. The system further has a provider server for providing at least one location based service. The system further has a location server having a location secret. The system further has at least one mobile device comprising a radiation receiver for receiving the radiation from the beacons and determining at least one property of the radiation. The mobile device has a location engine for controlling the location information, the location engine being coupled to the radiation receiver for obtaining the location identifier and the property of the radiation. The mobile device further has a location based application arranged for using the location information, the location based application further having customer data indicative of use rights of using the location information.

In the system, the provider server is arranged for communicating with the location server for generating unique data for the location based application based on the location secret, providing the unique data based on the location secret, authorizing the location based application prior to using the location based service by exchanging at least part of the unique data with the location based application, and providing at least one location based service in dependence on an encrypted location.

In the system, the location server is arranged for communicating with the provider server for generating said unique data, receiving the property of the radiation from the location engine and based on the property of the radiation determining the location of the mobile device, and encrypting the location and transferring the encrypted location to the location engine.

In the system the location engine is arranged for receiving at least part of the customer data from the location based application, obtaining a verification of the customer data as received from the location based application, the verification indicating that the use rights for the obtained location identifier allow transfer of the location information to the location based application, and, upon obtaining the verification, transferring the encrypted location to the location based application.

In the system, the location based application is arranged for exchanging at least part of the unique data with the provider server; processing the location information based on the customer data, and using the location based service as provided in dependence on the encrypted location.

The above system provides the mobile device, which may be an end-user device, with conditional access to location information and/or location based services according to use rights as controlled by a customer on the customer's premises or in the customer's venues where the beacons are installed. The location based services are provided by the provider server and used by the location based application.

The radiation receiver is for receiving the radiation from the beacons and determining at least one property of the radiation. In this document the property of the radiation as determined means any data decoded from the received radiation or any other feature that is indicative of the position of the radiation receiver with respect to the beacon or beacons that emit the radiation. The property may for example be the beacon identifier, while receiving such beacon identifier indicates that the mobile device is in the vicinity of the beacon. The property may also be signal strength, signal angle, signal timing, etc of said received radiation which property is indicative of the actual distance or position of the mobile device with respect to one or more beacons. Also, the property may represent a combination of radiation received from multiple beacons, for example simultaneously or subsequently at the same location, a fingerprint of multiple signal strengths, etc. The property is transferred from the radiation receiver to the location server by the location engine so as to enable the location server to determine the present location of the mobile device. The determination may be based on the beacon identifier as present in the property, and may further be based on the signal strength or any of the other elements that are included in said property. As such, determining the actual location of a mobile device based on one or more properties of the received radiation is known, e.g. from the prior art references [1], [2], [3], or [4].

For protecting the location information the location based application is to be authorized by the provider server prior to using the location based service. The authorizing is achieved by exchanging at least part of the unique data with the location based application, e.g. during an enrollment phase or installation process. Advantageously the provider server by said authorizing controls which location based applications may use the location based services. Also advantageously, the location server which determines the actual location is not located within the mobile device, and therefore cannot be easily manipulated. So the location server determines the location of the mobile device remotely from the mobile device, and subsequently encrypts the location before transferring location data to its final, trusted destination. For example, the trusted destination may be the location based application as authorized, or the provider server which is inherently in a secure and trusted environment. Advantageously, any intermediate element that has to forward the location data to its trusted destination cannot use or otherwise access, use or differently distribute the location of the mobile device. This is due to the fact that the location is encrypted, whereas the decryption data is only available at the trusted destination. Based on this construct it is possible to transfer location information in a secure way to trusted destinations to implement a location based conditional access system for indoor location information. The location engine in the mobile device will not receive or store any key data. Only the authorized location based application will receive such key data, or will enjoy the location based services directly from the provider server which has the required key data to access the location information. So, advantageously, the location engine need not be authorized or trusted by each individual customer or provider, while still controlling the location information process between the location based application, the location server and the radiation receiver.

The customer data that is indicative of use rights as recited above refer to information that provides access to a license defining which use of the location data is permitted, which parties may access the location or access location based services, etc. Establishing, distributing and verifying such customer data may also be called digital rights management, known as such. The access to the license could be direct or indirect. Direct access relates to the situation wherein the customer data comprises the license itself, e.g. when the customer data comprise a digital authorization certificate. Indirect access in turn relates to the situation when the customer data functions as a pointer to the license. The latter e.g. includes the use of a unique identifier (UID) as a customer identifier. The UID allows the retrieval of the license from a license database and thus represents an indirection. It should further be noted that unique here implies unique to the system; rather than unique per se. The generation of unique identifiers of a fixed bit width is well known to those skilled in the art (see e.g. http://en.wikipedia.org/wiki/Universally unique identifier). More advanced schemes generally involve random number generators and/or (cryptographic) hash functions.

The above system uses unique data for authorizing the location based application as a secure proof that is verifiable by the location server. Here a secure proof indicates a proof which has at least has some protection against tampering; cryptographic techniques may be used to secure the generation of such a secure proof; e.g. the proof could be encrypted using a symmetric cipher wherein both the generating and the verifying party have access to a secret key based on the location secret, thereby providing at least some protection against tampering. Alternatively the proof could be provided in the form of a digital certificate that makes use of public-key cryptography, such as an X.509 (authorization) certificate. The underlying idea being that authenticity of the secure proof can be verified by the recipient or verifier and that there is a hurdle preventing a third party from spoofing a secure proof.

The above features add further location information protection to the process of making location information available. Effectively the location based services are made available exclusively to the authorized location based application, while avoiding that other elements in the mobile device may get access to the location or location based services. The process of providing the location information is controlled by the location engine in the mobile device. Advantageously the location engine, i.e. the processing element in the mobile device that controls the process of making location information available, does not have access to the actual location and does not need to be authorized, and does not need to receive any key data.

Various operational elements in the above system may be implemented by performing the respective methods as further defined in the appended claims: a provider server method, a location server method, a location engine method, and a location based application method. Also, the methods in the above system may be implemented by respective devices, i.e. provider server device, a location server device, a location engine unit in a mobile device, and a location based application unit in a mobile device.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps or stages of a method according to the invention when the computer program is run on a computer. Preferably, the computer program is embodied on a computer readable medium.

Another aspect of the invention provides a method of making the computer program available for downloading, for example the location based application. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

The proposed localization system, also known as indoor position system, system for protecting location information, or location system, provides at least a basic function; i.e. providing information on the current position or location of a mobile device or person associated with the mobile device in a region having beacons, e.g. an indoor environment.

The above basic function can be perceived as a location or position service. This service in turn can be used to provide further services. Within the context of an indoor navigation system, the position or location could be used to subsequently direct or guide a device user from one location to another; e.g. along a series of locations; i.e. on a route. Within a shopping context, such a route could be created on the fly; e.g. using a web-based shopping service based on an end-user's shopping list.

In the process of navigating along the route, the end-user could be made aware of points of interest, which in a shopping context could represent special offers, etc.

Such indoor location systems may use one or more different location determination technologies to determine the location of the mobile device within the premises.

Throughout this document location systems will be presented that use one or more indoor positioning technologies to determine the position of portable devices within the premises; and subsequently use this information; e.g. by sharing the position with the device user and/or by using the position within the location context.

Figure 1:
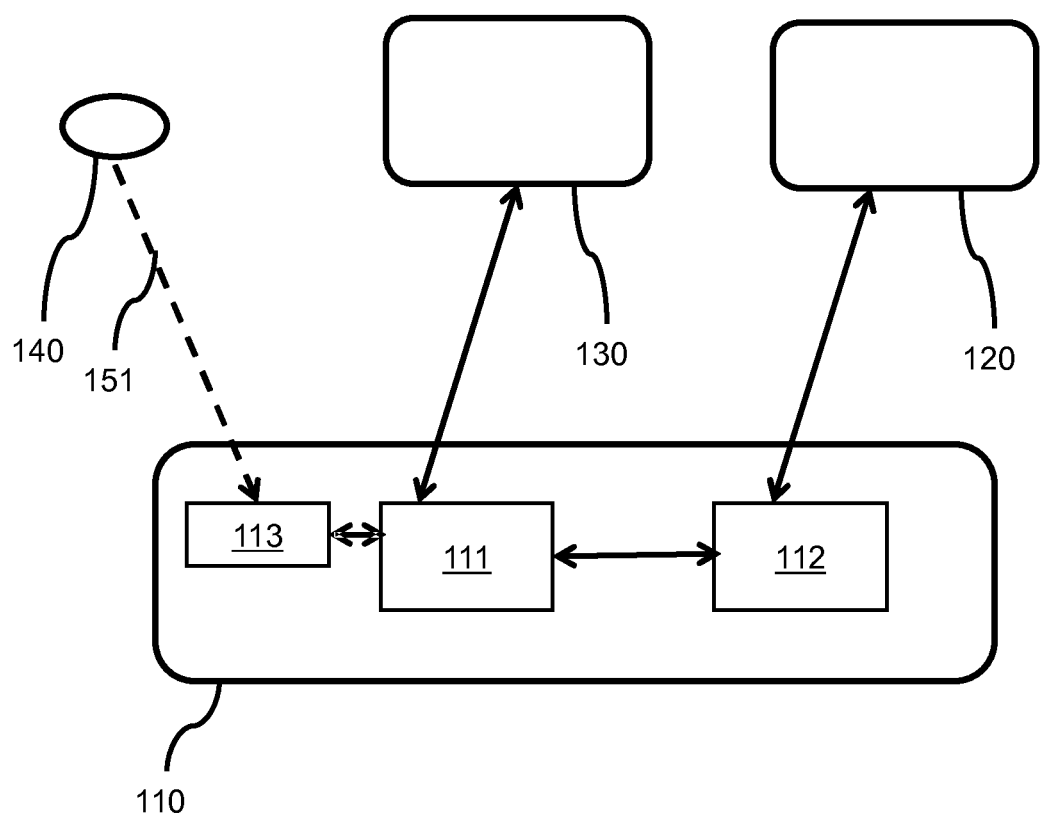
FIG. 1 shows a general device centric localization system.

FIG. 1 shows a general device centric localization system. The localization system 100 comprises beacons 140 that are positioned at known locations in a region that is covered by a customer of the localization system, e.g. a shop owner. The region may be an indoor space like a shop, a venue like an exhibition centre or an airport, or any other area where the customer wants to enable location based services. The beacons have a radiation emitter for emitting the radiation having a beacon identifier. As such localization systems are known, for example from references [2], [3] or [4].

In said region mobile devices are present and may require location based services. One mobile device 110 is shown in the Figure, which device has a radiation receiver 113 to receive radiation that is radiated by the beacons. The radiation may, for example, be light or RF radiation, and is indicated by a dashed arrow 151 in the Figure. In the mobile device a location engine 111 is implemented for controlling the process of providing access to location based services to at least one location based application 112. The location engine is coupled to the radiation receiver 113 for obtaining at least one property of the radiation. A location server 130 has location information of the respective beacons, and communicates with the location engine to determine the actual location. A provider server 120 communicates with the location based application 112 to provide a location based service. Said communication may, for example, be via WiFi, Bluetooth, GSM, etc, while the location server and/or the provider server may be coupled to a network like internet, or may be implemented as a server in the so-called cloud.

In practice indoor positioning is an area of growing relevance with location-based applications such as indoor navigation, asset tracking, service alerts and other offerings, already in the market. Providing location-based services (LBS) is yet another application that is relevant to many businesses in retail to increase consumer loyalty.

In a typical indoor localization system, a user has a device that is localized with respect to a location network. The location network consists of multiple anchor nodes or beacons, which are devices whose positions are known a priori to the location server. Multiple technologies like Coded-Light, RF fingerprinting etc. can be used for the indoor localization. Positioning of a device may be achieved using the radiation as received from the beacons at the mobile device. Radiation measurements may be made and processed at the location network (network-centric) or measurements may be made and processed at the device (device-centric). Positioning techniques known as such may be employed, for example based on signal property measurements such as RSSI (receiver signal strength indicator), ToA (time of arrival) and AoA (Angle of arrival) in the case of wireless radio radiation, or using coded light identifiers as in the case of a light based positioning system.

In a device-centric positioning system, a mobile device may additionally implement the location engine 111 as shown in FIG. 1. The location engine may be implemented either in hardware or in software or a combination, and is coupled to a radiation receiver to perform the measurements (e.g. RSSI or Coded-Light) which is later used to calculate the position.

In known systems the position may be calculated by the location engine with help of additional data from the location server 130 or the measurements are sent to the location server where the positions are calculated. The resulting position is then used in a location based application 112 (usually called app) in combination with the provider server. In such systems it is important that the location engine running on the device is protected and controlled for usage according to the policies defined by the owner of the location system, called the customer hereafter. In particular, a known location engine may not have any protection against its usage by different location based apps, for example controlled by different location based service provider. Hence a true owner of the location engine or of the beacon infrastructure at a particular region is not able to control how the location engine is used.

In the enhanced system as described below two issues are relevant. The system controls that only specific location based apps can use the location engine, whereas a non-authorized app does not get location data. Also the system controls that a specific location based app can use the location engine only in the specific region of the customer. For example, the system does not allow use of an app of one shop in another shop, and prevents use of the location engine if use rights do not allow so.

Thereto the system provides a method to advertise by the beacons of the access location network, additional information to be used by the location engine in its processing or decision making. Also the system provides a method to advertise, by the location based application, additional information that can be used by the location engine in combination with the advertisements of the beacons in its processing or decision making. Also the system provides a method at the location server which, upon receiving the additional information originating from the beacons or the app via the location engine, further processes the location data and make a decision whether to transfer the location data. Also the system provides encryption and decryption of the actual location data based on keys available from the location server or the provider server. In the following the enhanced system is described in detail with reference to FIG. 2.

Figure 2:
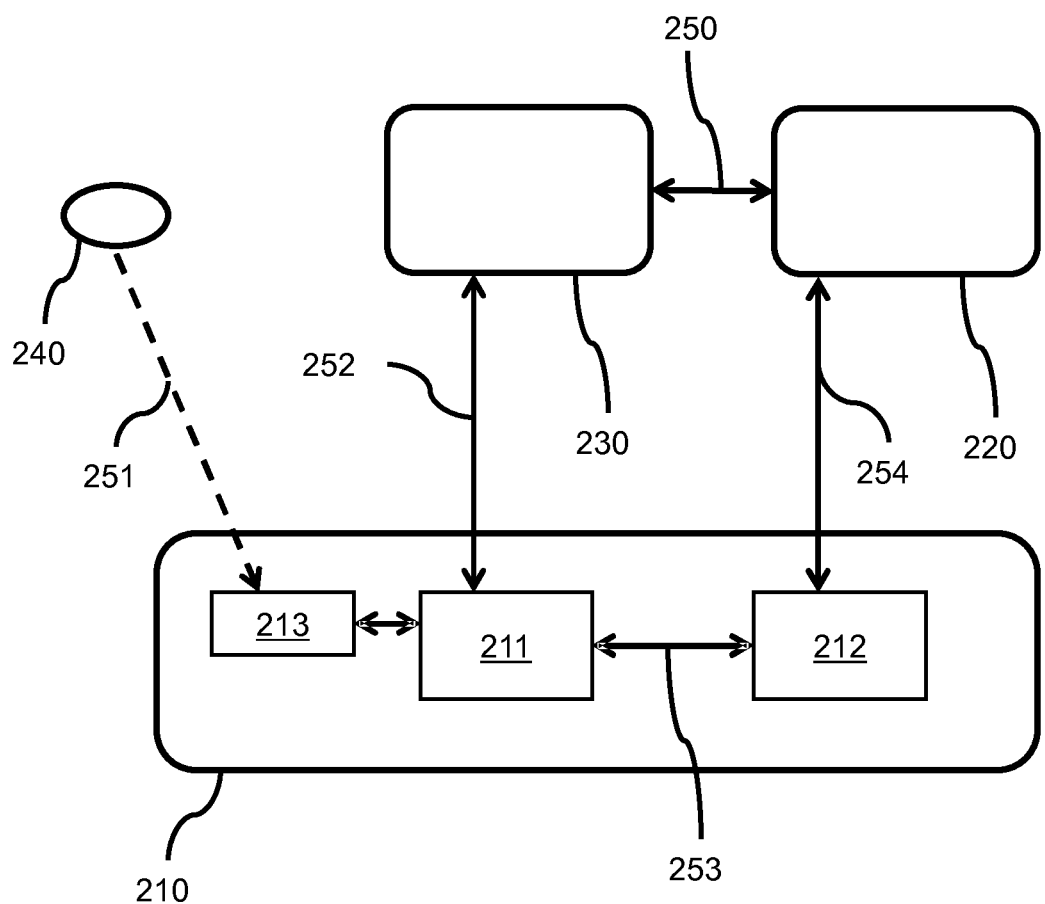
FIG. 2 shows a system for protecting location information.

FIG. 2 shows a system for protecting location information. Aspects of the system that correspond to the known system described above with reference to FIG. 1 are not repeated here. The localization system 200 comprises beacons 240 that are positioned at known locations in an area that is covered by a customer of the localization system, e.g. a shop owner. The area may be a region, building, (part of) a shopping mall, an airport, a conference venue, an amusement park, etc. Each beacon has a radiation emitter for emitting the radiation having a beacon identifier and at least one location identifier for identifying the area where the beacons are located.

A mobile device 210 in said region has a radiation receiver 213 to receive radiation from the beacons and determining at least one property of the radiation. The radiation including the beacon identifier and at least one location identifier is indicated by a dashed arrow 251 in the Figure. In the mobile device a location engine 211 is implemented for controlling, via an application interface 253, the process of providing access to location based services to at least one location based application 212. The location engine is coupled to the radiation receiver 213 for obtaining the location identifier and at least one property of the radiation. A provider server 220 for providing at least one location based service communicates via a provider interface 254 with the location based application 212 to provide a location based service. The provider server is further arranged to communicate with the location server via a server interface 250 as elucidated below, for example a further wireless interface. A location server 230 has location information of the respective beacons, and communicates via a wireless interface 252 with the location engine to determine the actual location.

In practice, various interfaces may be implemented wirelessly via the same wireless receivers and transmitters and transfer protocols to access a network to which the location server and the provider server are coupled. Said interfaces may, for example, be WiFi, Bluetooth, GSM, etc, while the location server and/or the provider server may be coupled to a network like internet, or may be implemented as a server in the so-called cloud.

In the system for protecting location information the elements are further arranged as follows. The location server 230 has a location secret, which assigned to the region as controlled by the customer and identified by the location identifier that is transmitted via the beacons. In the mobile device the location engine is provided for controlling the location information. The location engine is coupled to the radiation receiver for obtaining the location identifier and the property of the radiation. For example, the radiation receiver may be a standard peripheral of the mobile device that is accessed via a standard interface in the mobile device. The location based application is arranged for using the location information, and has customer data indicative of use rights of using the location information.

In the system, the provider server is arranged for communicating with the location server, via server interface 250, for generating unique data for the location based application based on the location secret. Prior to using the location based service, the unique data is provided based on the location secret and the location based application is authorized by exchanging at least part of the unique data via the provider interface 254. The provider server is further arranged to provide at least one location based service in dependence on an encrypted location. For example, the encrypted location may be received via the provider interface, or the location based application may first decrypt the location and then access the location based service as provided.

In the system, the location server is arranged to communicate with the provider server, via server interface 250, for generating said unique data. The location server is arranged to receive, via the wireless interface 252 the property of the radiation from the location engine. The property may include a beacon identifier, or further signal properties well known as such. The location server is further arranged to determine, based on the property of the radiation, the actual location of the mobile device. The location server is further arranged to encrypt the location and transfer the encrypted location to the location engine.

In the system, the location engine is arranged to receive at least part of the customer data from the location based application, via the application interface 253. The location engine is further arranged to obtain a verification of the customer data as received from the location based application. The verification indicates that the use rights for the obtained location identifier allow transfer of the location information to the location based application. If the use rights do not allow such transfer or use of the location, no verification can be obtained, i.e. the lack of verification represents a negative outcome and indicates that said transfer is not allowed. Upon obtaining the verification, the location engine transfers the encrypted location to the location based application. The process of obtaining verification may precede the above functions of determining and/or encrypting the actual location, which functions need not be performed when verification is lacking.

In the system, the location based application is arranged to exchange at least part of the unique data with the provider server, via the provider interface 254, for being authorized by the provider server prior to using the location based service. Also, the location based application has the customer data, e.g. as provided by the location server, via a subscription at the customer's website, manually entered by the user of the mobile device, etc. As such, authorizing an application is known, and involves in an enrollment or installation process, exchanging and storing some elements of the unique data as proof of the authorized state of the application. The location based application is further arranged to process, in the authorized state, the location information based on the customer data.

The system for protection of location information effectively gives a location based application conditional access to location information or location based services. The location based application is first to be authorized by the provider server by exchanging the unique data, while the location based application also has obtained the customer data indicative of rights of using the location information. The customer data may also be called license information. These steps will usually be performed during an installation phase. For example, the authorizing may include verifying whether the application as such has been tampered with, e.g. by determining a checksum on the respective program code.

In operational use, the radiation receiver receives radiation from beacons and determines at least one property of the radiation. The location engine in the mobile device now performs the following steps. First from the location based application a request is received for location information. Subsequently the property of the radiation is transferred from the radiation receiver to the location server via the location engine. The location server verifies whether the license information allows access to the location information by the location based application in the mobile device. The verification indicates that the license information allows the transfer of location information to the location based application. Alternatively the verification may also be provided by the location engine. So the verification indicates that the license information allows access to the location information by the location based application for the area indicated by the location identifier corresponding to the customer data.

Based on the property of the radiation, e.g. the beacon identifier and the signal strength, the location server determines the location of the mobile device. Upon successful verification the location information is transferred to the location based application. Hence the above system provides the actual location the location based application in the mobile device, which may be an end-user device, i.e. conditional access to location information that the location based application can use for location functions.

In the above system, the location server may be arranged to provide, on request, corresponding customer data that corresponds to the location identifier. In the system a particular location identifier is associated to a specific customer, which customer has respective customer data. The location server stores, or has access to, the system data including both the location identifier and the corresponding customer data. The location identifier identifies the area where the beacons are located, i.e. said area and beacons define the realm of the customer who owns the system. The customer may also install or configure the location server by, inter alia, selecting or otherwise defining the customer data, e.g. by entering a customer name and password. Hence the location server has access to the customer data corresponding to the location identifier. The location based application will also obtain customer data that indicates his rights for using the location information of the customer. The location server compares the customer data offered by the location based application to the customer data corresponding to the location identifier. When both customer data elements match, the verification is successful. In an embodiment the location engine may be arranged to obtain the verification by requesting the location server to provide the corresponding customer data, and to compare the corresponding customer data and the customer data received from the location based application.

In the above system, the location engine may be arranged to send the customer data and the location identifier to the location server and subsequently receive the verification from the location server. The location server may be arranged to receive the customer data and the location identifier, and provide the verification by comparing corresponding customer data corresponding to the location identifier and the customer data received from the location based application. Finally the verification result is transferred to the location engine via the wireless interface 252.

In the above system, the location server may be arranged to encrypt the location based on part of the unique data of the location based application. Furthermore, the location based application may be arranged for processing the location information by decrypting the encrypted location based on said part of the unique data. The actual location is now available to the application so as to be used for the location based service. As the application is authorized, the application is a trusted destination, which will use the location data as intended and allowed.

Alternatively in the above system, the location based application may be arranged for processing the location information by transferring the encrypted location to the provider server, while the provider server may be arranged to decrypt the encrypted location based on part of the unique data of the location based application and for providing the location based service in dependence on the decrypted location. In this alternative of the system the actual location is only revealed to the provider server, which then provides the location based service to the application based on the actual location. As the provider server itself is under the control of the service provider, the provider server inherently is a trusted destination. The actual location is not at all revealed within the mobile device.

In the above system, the location server may be arranged to, upon said verification, receive at least part of the unique data of the location based application. So, after successfully establishing that the application has the appropriate use rights, the location based application will transfer part of the unique data, such as a unique identifier.

It is noted that the unique key is never transferred to the location server. The location server either has the unique key (e.g. indexed by the unique identifier) or can generate the unique key based on a master key (e.g. the location secret) and the unique identifier. The location server may use such unique data to determine or check the encryption data that is used to encrypt the actual location. Also, the location server may be arranged to check the validity of the unique data based on the location secret. The location secret is available at the location server, and may, for example, be used to calculate and/or check a checksum or hash code across the received unique data.

In the above system, the location server may be arranged to encrypt the location based on a provider key that is received from the provider server, via the server interface 250. The provider key may be established once during an installation process, or may be regularly refreshed or may depend on the actual customer data, time of the day, etc. Correspondingly, the location based application may be arranged to process the location information by transferring the encrypted location to the provider server. Also, the provider server may be arranged to decrypt the encrypted location based on the provider key and for providing the location based service in dependence on the decrypted location. By providing and applying the provider key the actual location is securely protected, in particular when the provider key is often modified in a random way.

In the above system, the location identifier may be authenticated or cryptographically protected, e.g. encrypted based on key material as available in the location server. The beacons will transmit the protected location identifier, whereas the protected location identifier can be verified and or decrypted only by the location server. Also, the use rights may be restricted to using the location engine and/or the location information only at a specified location. Also, the use rights may be restricted to using the location engine and/or the location information only at a specified access network. Also, the use rights may be restricted to using the location engine and/or the location information only within a specified time period. If the use rights comprise such further restrictions, the location server and/or the location engine will comply by determining and comparing the actual location, the actual access network, and/or the actual time, day or date to the restrictions as defined. Only when allowed according to the restrictions the location services will be provided.

In the above system, said communicating between the location server and the provider server for generating said unique data may comprise sharing the location secret between the location server and the provider server. As both the provider server and the location server now have the location secret, corresponding key data and cryptographical control function can be performed with limited communication or even without further communication. Alternatively, the location secret only resides in the location server. The provider server is arranged to request the location server to generate the unique data based on the location secret. The unique data may depend on the customer data and/or the location identifier. The unique data will be transferred by the location server to the provider server via the server interface 250 so as to enable the provider server to authenticate the location based application.

In the above system, in the process of generating the unique data also further application data like a unique application identifier may be used, e.g. transferred to the provider server and/or location engine to be used during generating the unique data. Such unique data may then be cryptographically associated to the application via said unique application identifier and the location server via said location secret.

In the above system, the unique data may comprise a unique identifier and a unique key that are cryptographically associated. For example, the unique identifier may be used to identify the respective application, whereas the unique key may be used to encrypt and authenticate the actual location. Also, the customer data may comprise a customer identifier and/or security credentials. Similarly, for example, the customer identifier may be used to transfer a pointer to license rights, whereas the security credentials may be used to encrypt or cryptographically verify the use rights. Furthermore, the unique data and the customer data may constitute a set of security credentials that are cryptographically associated. In that case the location secret is also used to generate and/or control the customer data.

In the above system, the provider server is arranged to provide said part of the unique data to the location based application during installing the location based application on the mobile device. For example, additional requirements may apply during installation, e.g. the provider interface being a local wired interface instead of a wireless interface. Also a special token or device like a fingerprint scanner may be required to be present during installation to identify the user and/or the origin of the location based application.

In practice the above system may be implemented as follows. The system protects the usage of the location engine by only authorized apps belonging to the provider server. Exemplary details are given for an installation in a shopping area but can be equally applied to any other domain.

Before decisions on allowing the transfer of location data can be made, it is important that the entities are identified and authenticated. Therefore the beacons (or beacon nodes) emit a location identifier, e.g. called a Location Instance ID on interface 251 shown in FIG. 2. The location identifier identifies an area where the beacons are located and helps the location engine to decide if a customer is allowed to get position data at this particular area. In shopping, the location identifier could be a Store ID. In certain scenarios, multiple location identifiers can be advertised by the beacons, e.g. for overlapping areas of different shop owners.

In general no additional authentication is used for the identity of beacons as fake beacons usually are not the threat. Optionally authentication may be added to the location identifier if needed.

The location based app contains a customer data, e.g. a Customer_ID, which indicates who is licensed to use the position data and/or the location engine. The customer data may also include a further restrictions, e.g. to use the location engine for only certain locations or certain Access Location Networks, and/or for a restricted time. In the shopping scenario, the Customer_ID could be the Store_Owner_ID who has licensed to use the actual location in all his stores having the Store ID. In addition to the Customer_ID, the location based app also may contain, after authorization, the unique data including a Unique_ID and an associated cryptographic secret Unique_Key. The authorization can be performed with the provider server based on well-known authorization protocols like OAuth 2.0 [5] that exchanges the client token information containing the Customer_ID in the location based application. Additionally the user may be redirected to a browser based login page of the provider server to authorize based on user input. The Customer_ID and the Unique_ID may be sent to the location engine via application interface 253 in FIG. 2. It is noted that the location engine does not receive the unique key, so it cannot encrypt or decrypt the location.

The Unique_ID and Unique_Key may be created by the provider server when the app is installed on the Mobile device the first time and provided via provider interface 254 in FIG. 2. The provider server creates the Unique_Key either based on a location secret preshared with the location server, or the location server creates the unique data itself based on interactions on server interface 250 in FIG. 2.

The location engine has multiple options to ensure that the authorized app is rightfully requesting location data. The location engine can request the location server to provide the Customer_ID for the Location_Instance_ID via wireless interface 252 in FIG. 2. to first check if the transaction should go on. Alternatively the location engine sends the Customer_ID and Location_Instance_ID to the location server, while the location server has to decide if the transaction should go ahead. Subsequently, if the transaction should go ahead, the location engine can provide the Unique_ID to location server. The location server can check the validity of the Unique_ID, and can obtain the Unique_key since the unique data are either generated by the location server or based on a location secret known to the location server. So no key is sent, instead the location server either knows or can compute the unique key based on the Unique_ID. After checking the validity, the location server can also check if this particular Unique_ID is allowed to access the actual location for that particular region and at that particular point in time if so restricted.

After the location server determines that the checks have been successful, it can determine the actual position data of the mobile device based on measurements via the radiation receiver and the location engine. Then the location is encrypted, either encrypted with the Unique_Key that is assigned to the app, or encrypted with a provider key that is known only to the provider server.

If the location is sent encrypted with the Unique_Key, then the location based app can decrypt the information and use the actual location immediately or sent it to the provider server to get a location specific service.

If the location is encrypted by the provider key, the encrypted location is first transferred via the wireless interface 252 to the location and then to the location based application via application interface 253. Then the encrypted location is relayed by the location based application to the service provider on the provider interface 254. The service provider decrypts the data to get the location and provides the location based service to the mobile on the provider interface. This is a very secure option since the location is never exposed on the mobile device.

In a practical embodiment the location system may be embodied by executing various methods at respective units in the system. The units may be implemented in hardware so as to constitute respective devices, or may be implemented in software to be executed by various computers or processors. At least the following methods are presented to cooperate for achieving the protection of location data as described above.

Figure 3:
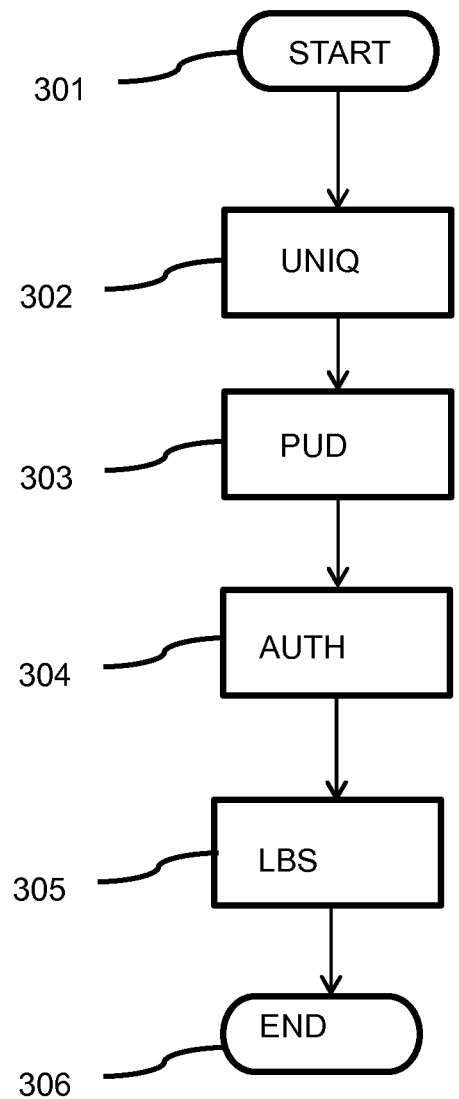
FIG. 3 shows an example of a provider server method.

FIG. 3 shows an example of a provider server method. The method is for use in a provider server as defined in the system for protecting location information as described above. The method starts at node START 301 and includes as a first stage UNIQ 302 communicating with the location server for generating unique data based on the location secret. The unique data is generated for different users individually or the unique data contains a master secret which enables creating additional data per user at a later stage. The user identity is used to link the user data or to generate the new data. In a next stage PUD 303 the method provides the unique data based on the location secret to the location server that is designated for providing location for its location based services. For example, the provider server sends a request to the location server to generate the unique data based on the location secret and some identification data from the location based application. In a next stage AUTH 304 the method authorizes the location based application on the mobile device based on well-known protocols like OAuth 2.0 [5] that exchanges the client token information containing the Customer_ID in the location based application. Additionally the user may be redirected to a browser based login page of the provider server to authorize based on user input. After a successful authorization, the unique data is exchanged with the location based application for further use during the localization. It is noted that the stages UNIQ, PUD and AUTH are performed prior to using the location based service, usually only once during installation of the location based application or an enrollment process for enrolling the location based application based on user data entered by the user of the mobile device. The unique data is only provided to designated location based applications that are used for providing location based service. In a next stage LBS 305 the method provides at least one location based service to the location based application in dependence on the encrypted location. In practice the stage LBS may be repeatedly executed to provide multiple and/or varied the location based services to the location based application, which is authorized once prior to said use. The method stops at node END 306.

Figure 4:
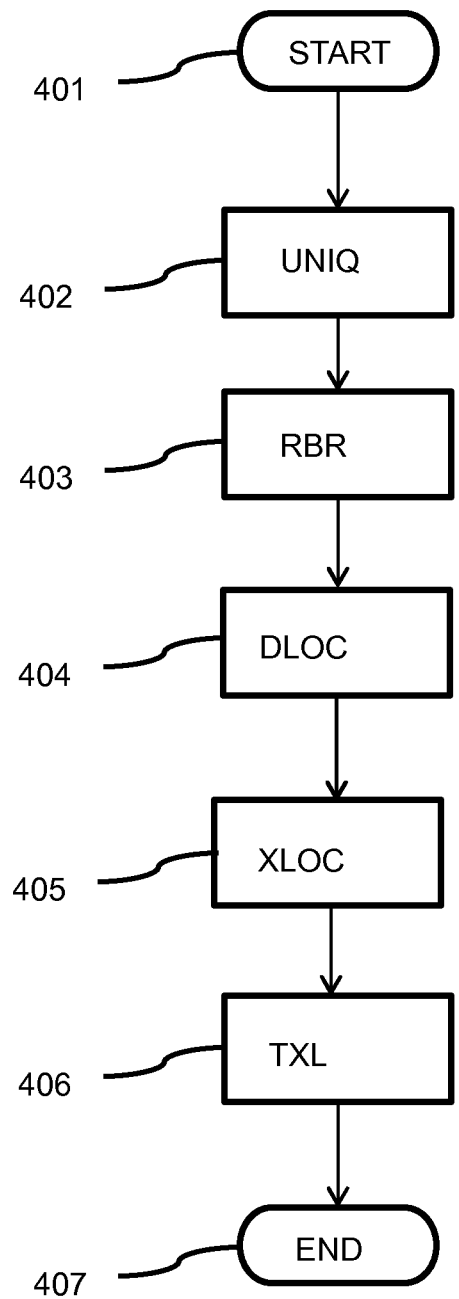
FIG. 4 shows a location server method.

FIG. 4 shows a location server method. The method is for use in a location server as defined in the system for protecting location information as described above. The method starts at node START 401 and includes a first stage UNIQ 402 of communicating with the provider server for receiving or generating unique data based on the location secret. Additionally the provider server defines the constraints that may apply to the customers of the provider server based on contractual obligations. In a next stage RBR 403 the method receives the beacon identifier and the property of the radiation from the location engine. If additional customer information is provided, the location server also judges if the location information can be provided for such a customer based on constraints defined. In a next stage DLOC 404 the method determines, based on the property of the radiation, the location of the mobile device. In a next stage XLOC 405 the method encrypts the location based on the unique data that is specific to the location based application and/or the user of the mobile device, or using a provider key receiver from the service provider. In a next stage TXL 406 the method transfers the encrypted location to the location engine. The method stops at node END 407.

Figure 5:
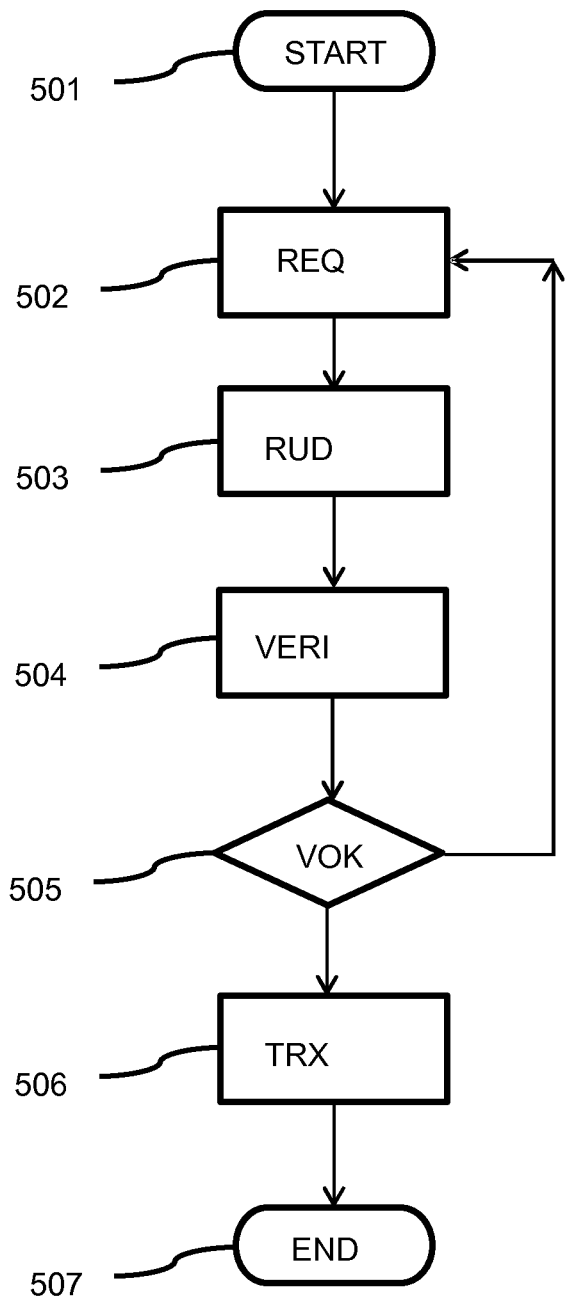
FIG. 5 shows a location engine method.

FIG. 5 shows a location engine method. The method is for use in a mobile device as a location engine as defined in the system for protecting location information as described above. The method starts at node START 501 and includes a first stage REQ of receiving a request of the location based application to use location data. Receiving the request initiates the further process of providing protected location information. In a next stage RUD 503 the method receives at least part of the unique data and the customer data from the location based application. In a next stage VERI 504 the method obtains a verification of the customer data as received from the location based application. The verification is either done on the location engine, or the data is transferred to the location server where the verification is performed which server then sends the verification result to the location engine. In decision stage VOK 505 it is decided whether the verification indicates that the use rights for the obtained location identifier allow transfer of the location information to the location based application. If not, the method continues to await a next request at stage REQ 502. Upon obtaining the verification, in a next stage TRX 506 the method transfers the encrypted location as received from the location server to the location based application. The method stops at node END 507.

Figure 6:
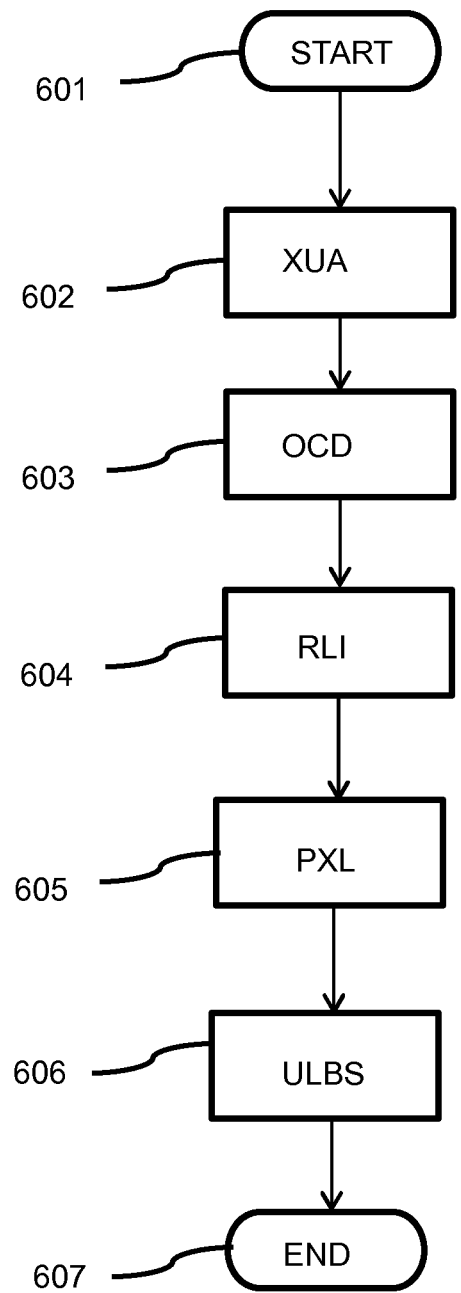
FIG. 6 shows a location based application method.

FIG. 6 shows a location based application method. The method is for use in a mobile device as a location based application as defined in the system for protecting location information as described above. The method starts at node START 601 and includes a first stage XUA 602 the method exchanges at least part of the unique data with the provider server for being authorized by the provider server. The authorization is based on well-known protocols like OAuth 2.0 [5] that exchanges the client token information containing the Customer_ID in the location based application. Additionally the user may be redirected to a browser based login page of the provider server to authorize based on user input. The unique data can contain the identity and a unique key that is used to protect the location information. This stage is usually performed once during installation or enrollment of the app in the system. In a next stage OCD 603 the method obtains customer data indicative of use rights of using the location information. This stage may be performed multiple times when the user receives such rights from one or more customers in the system. Use rights may be redefined, extended or limited as defined by the customer, e.g. the customer awarding some use rights when the user has bought items at the customer's shop. When the mobile device actually is present in the area of the customer where radiation of the beacons is received, the method proceeds by next stage RLI 604 for requesting location information by transmitting at least part of the unique data and the customer data to the location engine. In a next stage PXL 605 the method receives the encrypted location from the location engine and processes the encrypted location information based on the unique data. If a respective key is available then the location based application decrypts the location, else it forwards the encrypted location to the provider server. In a next stage ULBS 606 the method uses the location based service from the provider server as provided in dependence on the encrypted location. The method stops at node END 607.

Computer program products, downloadable from a network and/or stored on a computer-readable medium and/or microprocessor-executable medium, are provided that comprise program code instructions for implementing the above methods when executed on a computer for protecting location information, as elucidated further below.

The above system may be applied, for example, in indoor and outdoor positioning systems, or location-based lighting control using wireless devices. The invention applies generally to any system wherein conditionally location data or location based services are provided to a user based on the position of a mobile device in a region having beacons.

Also, the system or methods according to the present invention may be used in conjunction with one or more indoor location technologies based on visible light or radio frequency signals. For example, the beacons may be embodied by light sources or luminaires. The term "luminaire" refers to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations.

Also, such indoor location technologies may make use of established RF communication standards such as 802.15.7, 802.11, 802.15.4, Zigbee, Thread or Bluetooth® Low Energy (BLE) also known as Bluetooth® Smart. Notably the claimed invention may make use of multiple location technologies; for example in order to accommodate for an installed base and/or to enable participants to use their technology of preference.

The location server may store or have access to location data, e.g. in a database. Table 1 below provides an example of information that may be provided for respective beacons in a location database for a light based indoor location system, but subsets thereof may also be used in conjunction with an RF based location system.

TABLE 1

Exemplary location database entry.

| Field | Description |
| --- | --- |
| Beacon identifier | Unique identifier as transmitted by the beacon. |
| Coordinate | For example (x, y) on a map. |
| Mounting height (optional) | Mounting height (in meters) relative to the floor level. |
| Floor (optional) | Indicator of floor level |
| Customer ID (optional) | Associates a luminaire to a particular customer (or customers). |
| Authorization level (optional) | Associates a luminaire to a particular minimum authorization level. |
| Shop ID (optional) | Associate a luminaire to a particular shop (or shops). |

Typically, the mobile device 210, the provider server 220 and the location server 230 each comprise a processor (not shown) which executes appropriate software stored at the devices; for example, that software may have been downloaded and/or stored in a corresponding memory, e.g., a volatile memory such as RAM or a non-volatile memory such as Flash (not shown). The mobile device and servers may for example be equipped with microprocessors and memories (not shown). Alternatively, the mobile device and servers may, in whole or in part, be implemented in programmable logic, e.g., as field-programmable gate array (FPGA). The mobile device and servers may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc. In practice, the location engine may be implemented via a library of software subroutines that is linked to an operating system of a mobile device.

Many different ways of executing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein, or may be unrelated to the method. For example, stages UNIQ 302 and PUD 303 of the provider server method be executed, at least partially, in parallel, with the stages UNIQ 402 and RBR 403 of the location server method. Moreover, a given step may not have finished completely before a next step is started.

A method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
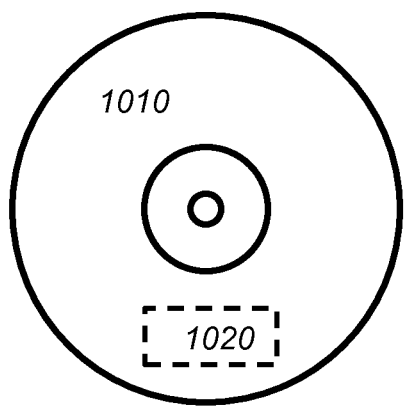
FIG. 7a shows a computer readable medium.

FIG. 7a shows a computer readable medium 1000 having a writable part 1010 comprising a computer program 1020, the computer program 1020 comprising instructions for causing a processor system to perform one or more methods in the system for protecting location information, according to an embodiment of the provider server method, the location server method, the location engine method or the location based application method as described with reference to FIG. 3-6. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 7B:
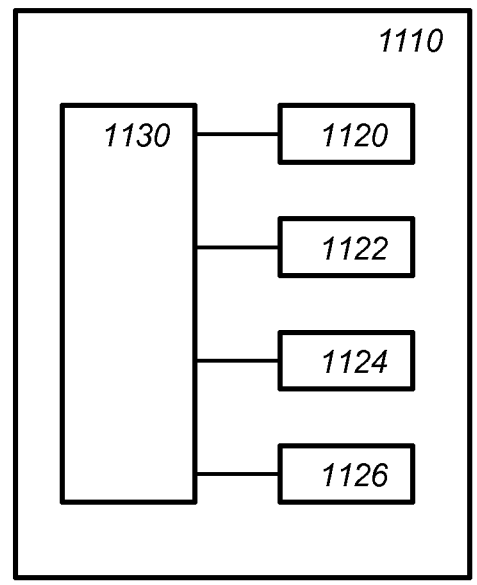
FIG. 7b shows in a schematic representation of a processor system.

FIG. 7b shows in a schematic representation of a processor system 1100 according to an embodiment of the provider server, the location server or the mobile device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It will be appreciated that, for clarity, the above description has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

REFERENCE DOCUMENTS

[1] US patent application 2015/0030157, Segev et al, Techniques for trusted location application and location provider communications.

[2] U.S. Pat. No. 7,966,021, P. F. Dietrich and G. S. Davi, Enhanced wireless node location using differential signal strength metric.

[3] U.S. Pat. No. 7,852,205, S. Huseth, et al., System and method for calibration of radio frequency location sensors.

[4] H. Liu, et al., "Survey of wireless indoor positioning techniques and systems", IEEE Trans on Systems, Man and Cybernetics, Part C: Applications and Reviews, pp. 1067-1080, 2007.

[5] RFC 6749, "The OAuth 2.0 Authorization Framework", https://tools.ietf.org/html/rfc6749

The invention claimed is:

1. A system for protecting location information, the system comprising:
    beacons, each beacon having a radiation emitter for emitting radiation comprising a beacon identifier and at least one location identifier for identifying an area where the beacon associated with the beacon identifier is located;
    a provider server for providing at least one location based service;
    a location server having a location secret;
    a mobile device comprising:
        a radiation receiver for receiving the radiation from the beacons and determining at least one property of the radiation,
        a location engine coupled to the radiation receiver for obtaining the location identifier and the property of the radiation, and
        a location based application having customer data indicative of use rights of using the location information;
    the provider server being arranged for:
        communicating with the location server for generating unique data for the location based application based on the location secret,
        providing the unique data based on the location secret,
        authorizing the location based application prior to using the location based service by exchanging at least part of the unique data with the location based application, and
        providing at least one location based service in dependence on an encrypted location;
    the location server being arranged for:
        communicating with the provider server for generating the unique data,
        receiving the property of the radiation from the location engine and based on the property of the radiation determining the location of the mobile device, and
        encrypting the location and transferring the encrypted location to the location engine;
    the location engine being arranged for controlling the location information by:
        receiving at least part of the customer data from the location based application,
        obtaining a verification of the customer data as received from the location based application, the verification indicating that the use rights for the obtained location identifier allow transfer of the location information to the location based application, and
        upon obtaining the verification, transferring the encrypted location to the location based application;
    the location based application being arranged for using the location information by:
        exchanging at least part of the unique data with the provider server for being authorized by the provider server,
        obtaining a customer data indicative of use rights of using the location information,
        requesting location information by transmitting at least part of the unique data and the customer data to the location engine,
        processing the encrypted location based on the unique data, and
        using the location based service as provided in dependence on the encrypted location.

2. The system as claimed in claim 1, wherein the location server is arranged for;
    providing, on request, corresponding customer data corresponding to the location identifier; and
    obtaining the verification by:
        requesting the location server to provide the corresponding customer data, and
        comparing the corresponding customer data and the customer data received from the location based application.

3. The system as claimed in claim 1, wherein:
    the location engine is arranged for sending the customer data and the location identifier to the location server and receiving the verification from the location server; and
    the location server is arranged for:
        receiving the customer data and the location identifier,
        providing the verification by comparing corresponding customer data corresponding to the location identifier and the customer data received from the location based application, and
        sending the verification to the location engine.

4. The system as claimed in claim 1, wherein:
    the location server is arranged for encrypting the location based on part of the unique data of the location based application, and
    the location based application is arranged for processing the encrypted location by decrypting the encrypted location based on the part of the unique data.

5. The system as claimed in claim 1, wherein the location server is arranged for, upon the verification, receiving at least part of the unique data of the location based application, and/or checking validity of the unique data based on the location secret.

6. The system as claimed in claim 1, wherein:
    the location server is arranged for encrypting the location based on a provider key that is received from the provider server;
    the location based application is arranged for processing the location information by transferring the encrypted location to the provider server; and
    the provider server is arranged for decrypting the encrypted location based on the provider key and for providing the location based service in dependence on the decrypted location.

7. The system as claimed in claim 1, wherein:
    the location identifier is authenticated or cryptographically protected, and/or
    the use rights are restricted to using the location engine and/or the location information for at least one of:
        a specified location,
        a specified access network,
        a specified time period.

8. The system as claimed in claim 1, wherein the communicating between the location server and the provider server for generating the unique data comprises one of:
- sharing the location secret between the location server and the provider server, or
- the provider server requesting the location server to generate the unique data based on the location secret.

9. The system as claimed in claim 1, wherein:
- the unique data comprise a unique identifier and a unique key that are cryptographically associated; and/or
- the customer data comprise a customer identifier and/or security credentials; and/or
- the unique data and the customer data constitute a set of security credentials that are cryptographically associated.

10. The system as claimed in claim 1, wherein the provider server is arranged for providing the part of the unique data to the location based application during installing the location based application on the mobile device.

11. The system as claimed in claim 1, wherein:
- the location based application is arranged for processing the encrypted location by transferring the encrypted location to the provider server; and
- the provider server is arranged for decrypting the encrypted location based on part of the unique data of the location based application and for providing the location based service in dependence on the decrypted location.

* * * * *